(12) United States Patent
Chen et al.

(10) Patent No.: US 12,023,697 B2
(45) Date of Patent: Jul. 2, 2024

(54) KITCHEN SPRAYER WITH FILTER AND A PULL-DOWN FAUCET

(71) Applicant: Ningbo Swave International Trading Co., Ltd., Zhejiang (CN)

(72) Inventors: Yaoda Chen, Ningbo (CN); Gen Luo, Ningbo (CN)

(73) Assignee: Ningbo Swave International Trading Co., Ltd., Ningbo (CN)

( * ) Notice: Subject to any disclaimer, the term of this patent is extended or adjusted under 35 U.S.C. 154(b) by 0 days.

(21) Appl. No.: 17/441,964

(22) PCT Filed: Jul. 29, 2021

(86) PCT No.: PCT/CN2021/109196
§ 371 (c)(1),
(2) Date: Sep. 22, 2021

(87) PCT Pub. No.: WO2023/004672
PCT Pub. Date: Feb. 2, 2023

(65) Prior Publication Data
US 2024/0024908 A1    Jan. 25, 2024

(51) Int. Cl.
*B05B 15/40* (2018.01)
*E03C 1/04* (2006.01)

(52) U.S. Cl.
CPC ............ *B05B 15/40* (2018.02); *E03C 1/0404* (2013.01); *E03C 2001/0415* (2013.01); *E03C 2201/40* (2013.01)

(58) Field of Classification Search
CPC .................. B05B 15/40; E03C 1/0404; E03C 2001/0415; E03C 2201/40

USPC ............................................ 4/678, 675, 567
See application file for complete search history.

(56) References Cited

U.S. PATENT DOCUMENTS

| | | | | |
|---|---|---|---|---|
| 5,842,639 A | * | 12/1998 | Walker | B05B 15/40 |
| | | | | 239/DIG. 14 |
| 6,368,503 B1 | * | 4/2002 | Williamson | E03C 1/04 |
| | | | | 4/678 |
| 8,863,769 B2 | * | 10/2014 | Andersen | E03C 1/0404 |
| | | | | 137/359 |
| 2002/0185420 A1 | * | 12/2002 | Horstman | B08B 3/026 |
| | | | | 210/490 |
| 2004/0007632 A1 | * | 1/2004 | Williams | B05B 15/40 |
| | | | | 239/338 |

(Continued)

FOREIGN PATENT DOCUMENTS

| CN | 205495864 U | * | 8/2016 | ............ E03C 1/04 |
|---|---|---|---|---|
| WO | WO-0100938 A1 | * | 1/2001 | ............ E03C 1/04 |

*Primary Examiner* — Lori L Baker

(57) ABSTRACT

A kitchen sprayer with filter includes a sprayer housing which has a top comprising a water inlet connectable to a faucet or a hose; a filter element assembly arranged in the sprayer housing having a filter element upper lid, a filter element and a filter element lower lid. The filter element is a hollow cylinder, an interior of the filter element is a purified water chamber, and an outside of the filter element is a raw water chamber; the filter element assembly is configured to be integrally mounted and disassembled with respect to the sprayer housing; a handle by which the filter element assembly is configured to be taken out is arranged at a bottom of the filter element lower lid; and a water outlet panel assembly is mounted on a bottom of the sprayer housing.

18 Claims, 12 Drawing Sheets

(56) References Cited

U.S. PATENT DOCUMENTS

| | | | |
|---|---|---|---|
| 2006/0131337 A1* | 6/2006 | Mertins | B05B 9/0403 |
| | | | 222/164 |
| 2010/0102177 A1* | 4/2010 | Andersen | E03C 1/0401 |
| | | | 248/79 |
| 2014/0215709 A1* | 8/2014 | Nightlinger | E03C 1/04 |
| | | | 4/677 |
| 2016/0236118 A1* | 8/2016 | Sharratt | B05B 15/40 |
| 2017/0326561 A1* | 11/2017 | Sharratt | B05B 15/40 |
| 2023/0060706 A1* | 3/2023 | Waldon | B05B 15/63 |

* cited by examiner

KITCHEN SPRAYER WITH FILTER AND A PULL-DOWN FAUCET

FIELD OF THE INVENTION

This disclosure relates to kitchen appliance, in particular to a kitchen sprayer with filter and a pull-down faucet.

DESCRIPTION OF THE PRIOR ART

The kitchen water is mainly used for cooking and cleaning food materials such as vegetables and fruits, as well as tableware. In order to ensure the cleaning of kitchen water, the kitchen water of many households is filtered through a filtering device before use. The kitchen water of some households may further pass through a heating device after filtering to obtain hot water. However, the existing filtering device is usually arranged before the heating device on the water pipeline of the household, and new impurities tend to be brought into the purified water after passing through the heating device. In addition, the filter element replacement for present filtering devices is complex and sometimes requires the aid of tools.

SUMMARY OF THE INVENTION

In view of the above deficiencies of the prior art, the technical problem to be solved by the present disclosure is to provide an improved kitchen sprayer with filter and a pull-down faucet.

In order to achieve the above object, the disclosure first provides a kitchen sprayer with filter is characterized by comprising a sprayer housing wherein a top of the sprayer housing is provided with a water inlet connectable to a faucet or a hose; a filter element assembly arranged in the sprayer housing having a filter element upper lid, a filter element and a filter element lower lid, wherein the filter element is a hollow cylinder, an interior of the filter element is a purified water chamber, and an outside of the filter element is a raw water chamber; the filter element assembly can be integrally mounted and disassembled with respect to the sprayer housing; a handle by which the filter element assembly can be taken out is arranged at a bottom of the filter element lower lid; a water outlet panel assembly mounted on a bottom of the sprayer housing.

Further, the filter element upper lid covers the top of the purified water chamber in the filter element, and the filter element lower lid communicates with the water outlet panel assembly; a sealing ring is arranged outside the filter element lower lid, and the raw water chamber communicating with the water inlet is defined between the sealing ring, the filter element and the sprayer housing.

Further, the water outlet panel assembly comprises a gasket, a water outlet panel and a water outlet panel lid.

Further, the water outlet panel is provided with a plurality of water outlet holes arranged in a plurality of concentric circles, and a diameter of the water outlet holes on water inlet side is larger than on water outlet side.

Further, the water outlet panel assembly is mounted at the bottom of the sprayer housing through a snap member disposed on an inner wall of the water outlet panel lid and an outer edge of the bottom of sprayer housing.

The kitchen sprayer with filter further comprises a switching device disposed on the sprayer housing and a threaded structure disposed on the filter element assembly, wherein when the switching device is rotated, the switching device is configured to drive the threaded structure to actuate a sealing device on the filter element assembly to move up and down, so that a flow channel of raw water entering from the water inlet is switched between passing through the filter element and not passing through the filter element.

Further, a switching ring is provided on an upper portion of the sprayer housing, and the thread structure is arranged between the switching ring and the filter element upper lid; the filter element upper lid and the filter element are movably matched; when the switching ring is rotated, the filter element upper lid can move up and down between a first position and a second position relative to the filter element under the action of the threaded structure; the filter element upper lid is provided with a plurality of outer ring openings corresponding to the raw water chamber and a plurality of inner ring openings corresponding to the purified water chamber; when the filter element upper lid is moved to the first position, the inner ring openings abut against a lower sealing gasket while the outer ring openings are detached from an upper sealing gasket, so that the raw water chamber of the filter element is in an open state and the purified water chamber is in a close state, thus the raw water flowing from the water inlet enters the purified water chamber from the raw water chamber after being filtered by the filter element, and then flows out through the water outlet panel assembly; when the filter element upper lid is moved to the second position, the outer ring openings abut against a upper sealing gasket while the inner ring openings are detached from the lower sealing gasket, so that the raw water chamber of the filter element is in a close state and the purified water chamber is in an open state, thus the raw water flowing from the water inlet directly enters the water outlet panel assembly through the purified water chamber and then flows out.

Alternatively, a rotating sleeve is arranged between a lower portion of the sprayer housing and the filter element lower lid; a guiding and positioning strip and a guiding and positioning groove which are matched with each other are arranged on a lower part of a periphery of the filter element lower lid and an inner peripheral face of the rotating sleeve; the water outlet panel lid is mounted on the rotating sleeve through a snap member; rotating the water outlet panel lid, the rotating sleeve also rotates and drives the filter element to rotate through the guiding and positioning strip and the guiding and positioning groove; the threaded structure is arranged between the filter element upper lid and sprayer housing; the filter element assembly is configured to move up and down while rotating under the action of the threaded structure, so that a sealing ring provided outside the periphery of the filter element lower lid switches between a sealed position and a disengaged position; when the sealing ring is in the sealed position, the sealing ring forms a seal with an inner wall of the rotating sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the rotating sleeve, thus the seal is released, and the water flow entering the raw water chamber directly flows through the flow channel between the periphery of the filter element lower lid and the inner wall of the rotating sleeve, and flows out through the water outlet panel.

Alternatively, a switching ring is provided on an upper portion of the sprayer housing, and the thread structure is arranged between the switching ring and the filter element upper lid; the filter element upper lid and the filter element are fixedly matched; a sleeve is arranged between a lower portion of the sprayer housing and the filter element lower lid; a guiding and positioning strip and a guiding and positioning groove which are matched with each other are arranged on a lower part of a periphery of the filter element lower lid and an inner peripheral face of the sleeve; when the switching ring is rotated, a sealing ring provided outside the periphery of the filter element lower lid switches between a sealed position and a disengaged position under the action of the threaded structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

Alternatively, a switching ring is provided on an upper portion of the sprayer housing, and a first thread structure is arranged between an inner side of the switching ring and an periphery of the filter element upper lid; the filter element upper lid and the filter element are fixedly matched; a rotating sleeve is arranged between a lower portion of the sprayer housing and the filter element lower lid; a second thread structure is arranged on a lower part of a periphery of the filter element lower lid and an inner peripheral face of the rotating sleeve; the water outlet panel lid is mounted on the rotating sleeve through a snap member; when the switching ring is rotated or when the water outlet panel lid is rotated so that the rotating sleeve is rotated as well, a sealing ring provided outside an upper portion of the periphery of the filter element lower lid switches between a sealed position and a disengaged position under the action of the first thread structure and the second thread structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

The disclosure also provides A pull-down faucet comprising a kitchen sprayer with filter and a retractable hose, wherein the kitchen sprayer comprises a sprayer housing wherein a top of the sprayer housing is provided with a water inlet connectable to a faucet or the retractable hose; a filter element assembly arranged in the sprayer housing having a filter element upper lid, a filter element and a filter element lower lid, wherein the filter element is a hollow cylinder, an interior of the filter element is a purified water chamber, and an outside of the filter element is a raw water chamber; the filter element assembly can be integrally mounted and disassembled with respect to the sprayer housing; a handle by which the filter element assembly can be taken out is arranged at a bottom of the filter element lower lid; a water outlet panel assembly mounted on a bottom of the sprayer housing.

Further, the filter element upper lid covers the top of the purified water chamber in the filter element, and the filter element lower lid communicates with the water outlet panel assembly; a sealing ring is arranged outside the filter element lower lid, and the raw water chamber communicating with the water inlet is defined between the sealing ring, the filter element and the sprayer housing.

Further, the water outlet panel assembly comprises a gasket, a water outlet panel and a water outlet panel lid.

Further, the water outlet panel is provided with a plurality of water outlet holes arranged in a plurality of concentric circles, and a diameter of the water outlet holes on water inlet side is larger than on water outlet side.

Further, the water outlet panel assembly is mounted at the bottom of the sprayer housing through a snap member disposed on an inner wall of the water outlet panel lid and an outer edge of the bottom of sprayer housing.

The pull-down faucet further comprises a switching device disposed on the sprayer housing and a threaded structure disposed on the filter element assembly, wherein when the switching device is rotated, the switching device is configured to drive the threaded structure to actuate a sealing device on the filter element assembly to move up and down, so that a flow channel of raw water entering from the water inlet is switched between passing through the filter element and not passing through the filter element.

Further, a switching ring is provided on an upper portion of the sprayer housing, and the thread structure is arranged between the switching ring and the filter element upper lid; the filter element upper lid and the filter element are movably matched; when the switching ring is rotated, the filter element upper lid can move up and down between a first position and a second position relative to the filter element under the action of the threaded structure; the filter element upper lid is provided with a plurality of outer ring openings corresponding to the raw water chamber and a plurality of inner ring openings corresponding to the purified water chamber; when the filter element upper lid is moved to the first position, the inner ring openings abut against a lower sealing gasket while the outer ring openings are detached from an upper sealing gasket, so that the raw water chamber of the filter element is in an open state and the purified water chamber is in a close state, thus the raw water flowing from the water inlet enters the purified water chamber from the raw water chamber after being filtered by the filter element, and then flows out through the water outlet panel assembly; when the filter element upper lid is moved to the second position, the outer ring openings abut against a upper sealing gasket while the inner ring openings are detached from the lower sealing gasket, so that the raw water chamber of the filter element is in a close state and the purified water chamber is in an open state, thus the raw water flowing from the water inlet directly enters the water outlet panel assembly through the purified water chamber and then flows out.

Alternatively, a rotating sleeve is arranged between a lower portion of the sprayer housing and the filter element lower lid; a guiding and positioning strip and a guiding and positioning groove which are matched with each other are arranged on a lower part of a periphery of the filter element lower lid and an inner peripheral face of the rotating sleeve; the water outlet panel lid is mounted on the rotating sleeve through a snap member; rotating the water outlet panel lid, the rotating sleeve also rotates and drives the filter element to rotate through the guiding and positioning strip and the guiding and positioning groove; the threaded structure is arranged between the filter element upper lid and sprayer housing; the filter element assembly is configured to move up and down while rotating under the action of the threaded structure, so that a sealing ring provided outside the periphery of the filter element lower lid switches between a sealed position and a disengaged position; when the sealing ring is in the sealed position, the sealing ring forms a seal with an inner wall of the rotating sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the rotating sleeve, thus the seal is released, and the water flow entering the raw water chamber directly flows through the flow channel between the periphery of the filter element lower lid and the inner wall of the rotating sleeve, and flows out through the water outlet panel.

Alternatively, a switching ring is provided on an upper portion of the sprayer housing, and the thread structure is arranged between the switching ring and the filter element upper lid; the filter element upper lid and the filter element are fixedly matched; a sleeve is arranged between a lower portion of the sprayer housing and the filter element lower lid; a guiding and positioning strip and a guiding and positioning groove which are matched with each other are arranged on a lower part of a periphery of the filter element lower lid and an inner peripheral face of the sleeve; when the switching ring is rotated, a sealing ring provided outside the periphery of the filter element lower lid switches between a sealed position and a disengaged position under the action of the threaded structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

Alternatively, a switching ring is provided on an upper portion of the sprayer housing, and a first thread structure is arranged between an inner side of the switching ring and an periphery of the filter element upper lid; the filter element upper lid and the filter element are fixedly matched; a rotating sleeve is arranged between a lower portion of the sprayer housing and the filter element lower lid; a second thread structure is arranged on a lower part of a periphery of the filter element lower lid and an inner peripheral face of the rotating sleeve; the water outlet panel lid is mounted on the rotating sleeve through a snap member; when the switching ring is rotated or when the water outlet panel lid is rotated so that the rotating sleeve is rotated as well, a sealing ring provided outside an upper portion of the periphery of the filter element lower lid switches between a sealed position and a disengaged position under the action of the first thread structure and the second thread structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

The kitchen sprayer with filter and the pull-down faucet according to the present disclosure have an advantage that the filter element is arranged at the end of the household water plumbing, so they can filter the hot water passing through the heating device previously. The filter element is convenient to install and replace. Further, a single-hand switching can also be conveniently performed between the filtering mode and the direct flushing mode according to needs.

DETAILED DESCRIPTION OF THE EMBODIMENTS

A plurality of preferred embodiments of the present disclosure are described below with reference to the drawings, which makes its technical content more clear and convenient to understand. The present disclosure may be embodied in many different forms of embodiments, and the scope of protection of the present disclosure is not limited to the embodiments set forthherein.

A first embodiment of a kitchen sprayer with filter according to the present disclosure is shown in FIGS. 1-6.

Figure 1:
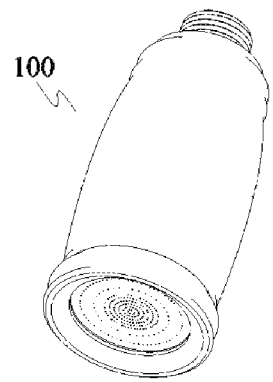
FIG. 1 is a perspective view of a sprayer with filter in a first embodiment of the present disclosure.
Figure 2:
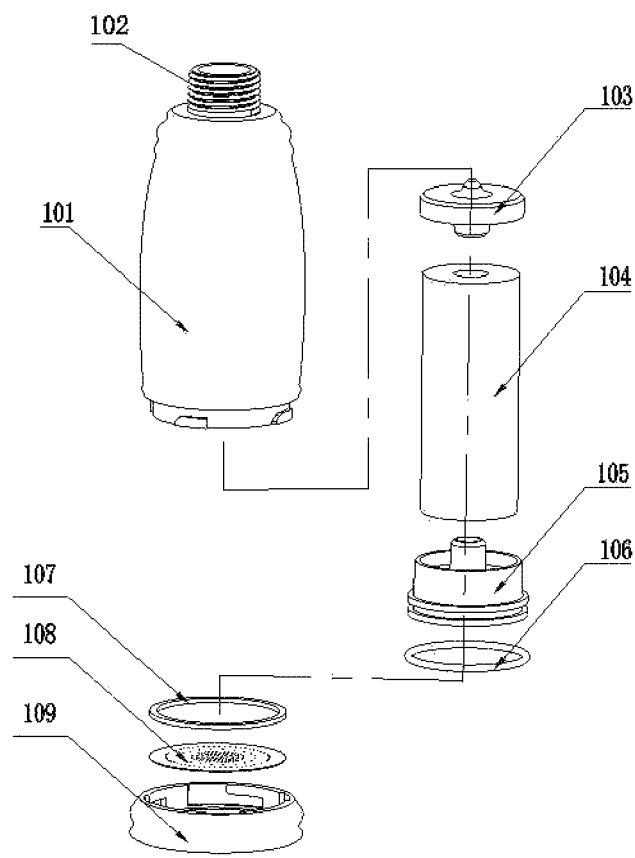
FIG. 2 is a exploded view of a sprayer with filter in the first embodiment of the present disclosure.
Figure 3:
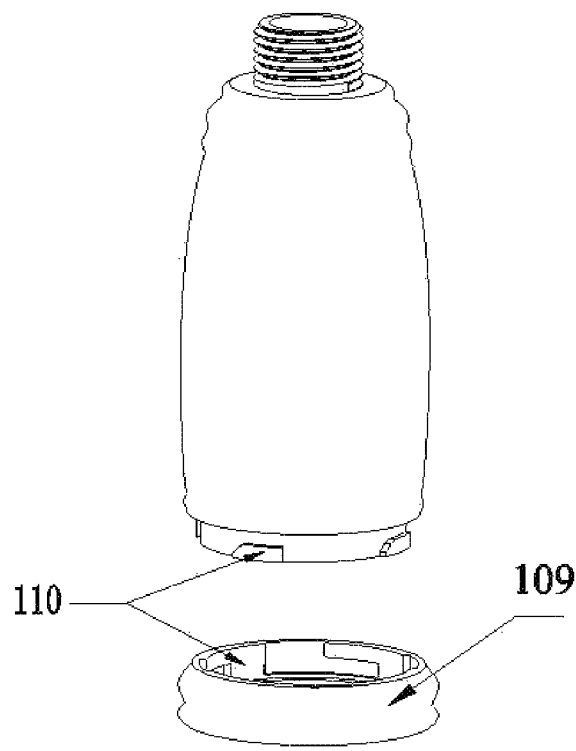
FIG. 3 is an assembly diagram of a water outlet panel assembly and a sprayer housing in the first embodiment of the present disclosure.
Figure 4:
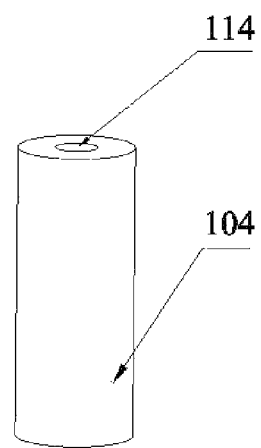
FIG. 4 is a perspective view of a filter element in the first embodiment of the present disclosure.
Figure 5:
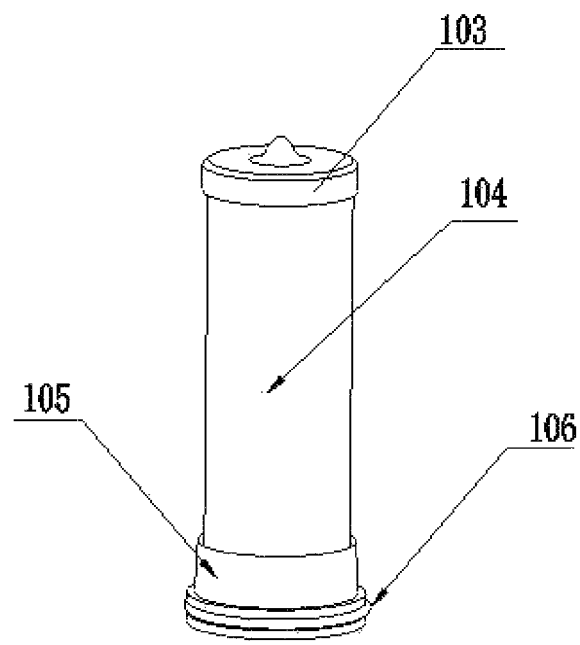
FIG. 5 is a perspective view of a filter element assembly in the first embodiment of the present disclosure.
Figure 6:
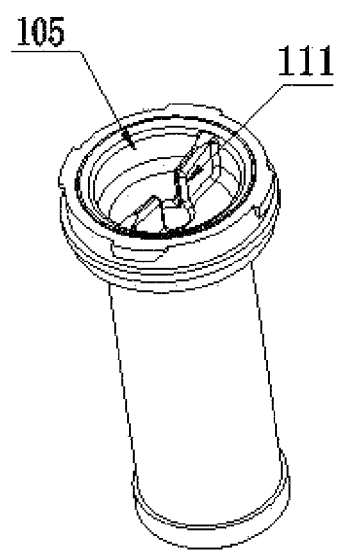
FIG. 6 is a perspective view of a handle of the filter element lower lid in the first embodiment of the present disclosure.
Figure 7:
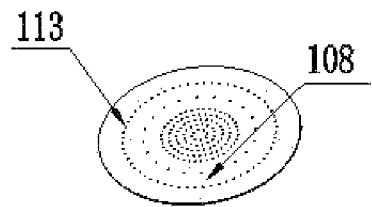
FIG. 7 is a perspective view of a water outlet panel in the first embodiment of the present disclosure.
Figure 8:
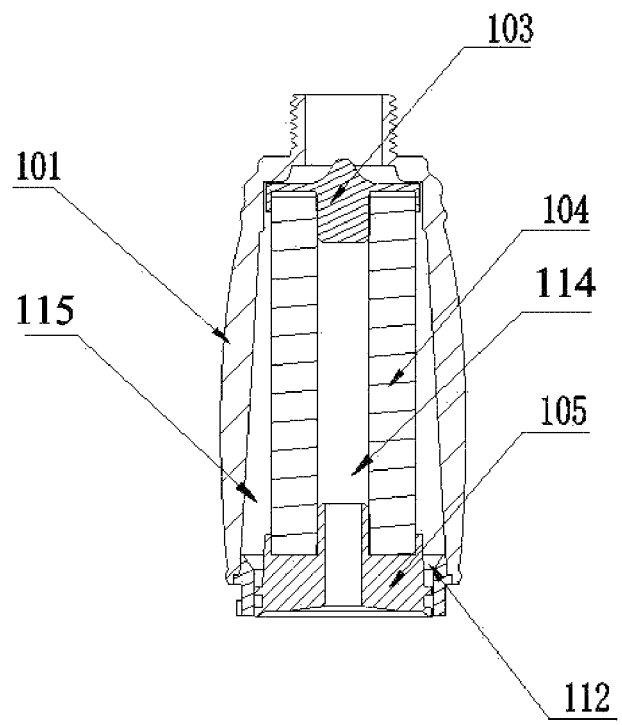
FIG. 8 is a sectional view of a sprayer in a first embodiment of the present disclosure.

FIG. 1 is a perspective view of a kitchen sprayer with filter 100. As can be seen in FIG. 1, the kitchen sprayer 100 is bell-shaped as a whole. FIG. 2 is an exploded view of a kitchen sprayer 100 As can be seen in FIG. 2, the kitchen sprayer 100 includes a sprayer housing 101. A threaded water inlet 102 is at the top of the sprayer housing 101. The threaded water inlet 102 is used to connect the faucet 601 or hose 600. A filter element assembly in the sprayer housing 101. The filter element assembly includes a filter element upper lid 103, filter element 104 and filter element lower lid 105. An O-shaped sealing ring 106 is arranged outside the filter element lower lid 105. The filter element 104 is a cylinder within which is a purified water chamber 114. The filter element upper lid 103 covers the top of the purified water chamber 114 in the filter element 104, and the filter element lower lid 105 communicates with the purified water chamber 114. The assembled filter element assembly forms a whole body, as shown in FIG. 5. A handle 111 by which the filter element assembly can be taken out as a whole body is arranged at a bottom of the filter element lower lid 105, as shown in FIG. 6. The kitchen sprayer 100 also includes a water outlet panel assembly 101 mounted on a bottom of the sprayer housing 101. The water outlet panel assembly comprises a gasket 107, a water outlet panel 108 and a water outlet panel lid 109. As shown in FIG. 3, the water outlet panel assembly is mounted at the bottom of the sprayer housing 101 through a snap member 110 disposed on an inner wall of the water outlet panel lid 109 and an outer edge of the bottom of sprayer housing 101. As shown in FIG. 7, the water outlet panel 108 is provided with a plurality of water outlet holes 113. The plurality of water outlet holes 113 are arranged in a plurality of concentric circles. A diameter of the water outlet holes 113 on water inlet side is larger than on water outlet side. FIG. 8 is an exploded view of the kitchen sprayer 100. As shown in FIG. 8, water entering from the top of the kitchen sprayer 100 bypasses the filter element upper lid 103, and enters the raw water chamber 115 between the filter element 104 and the sprayer housing 101 along the circumference of the filter element upper lid 103. Since the bottom of the raw water chamber 115 is sealed by the O-shaped sealing ring 106, the inner wall of the water outlet panel lid 109 and the gasket 107, the water can only flow through the filter element 104, and is filtered and enters the purified water chamber 114 of the filter element 104, and then flows out through the water outlet hole 113 via the filter element lower lid 105 and the water outlet panel 108.

Figure 9:
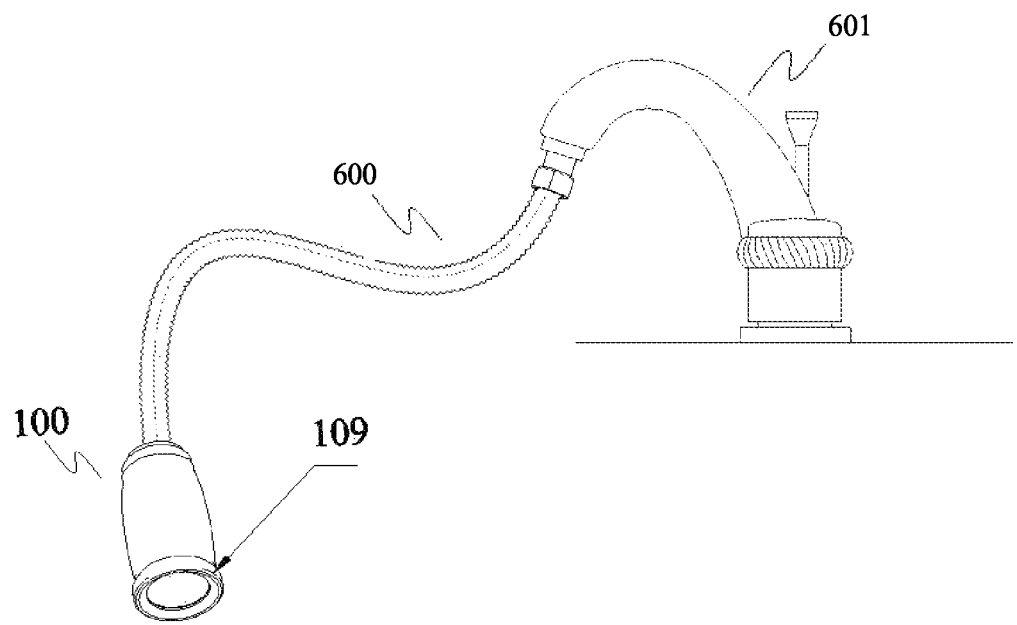
FIG. 9 is a perspective view of a pull-down faucet in the first embodiment of the present disclosure.

Further, a first pull-down faucet 601 according to the present disclosure, as shown in FIG. 9, uses a kitchen sprayer 100 with filter according to the present disclosure.

A second embodiment of a kitchen sprayer with filter according to the present disclosure is shown in FIGS. 10-14.

Figure 10:
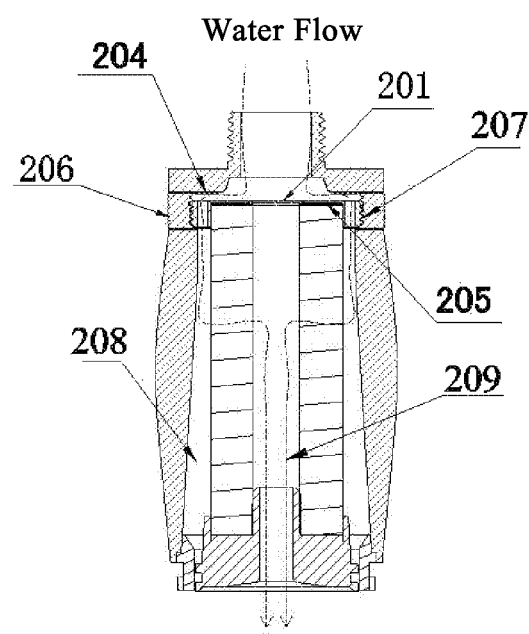
FIG. 10 is a sectional view of a sprayer in a filtering working state in a second embodiment of the present disclosure.
Figure 11:
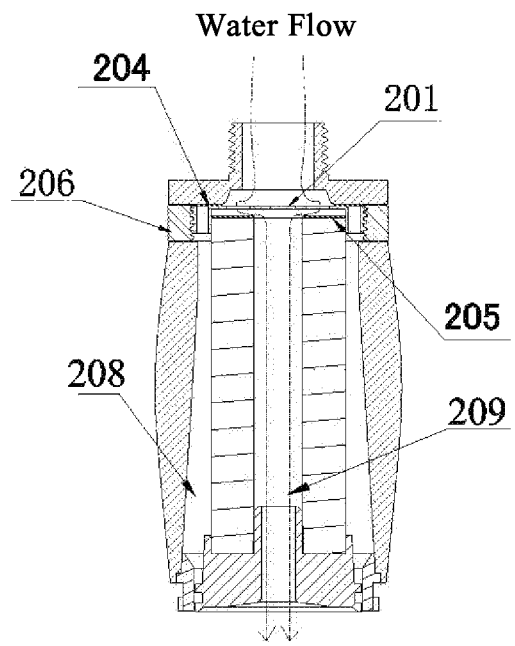
FIG. 11 is a sectional view of a sprayer in a directly flushing working state in the second embodiment of the present disclosure.
Figure 12:
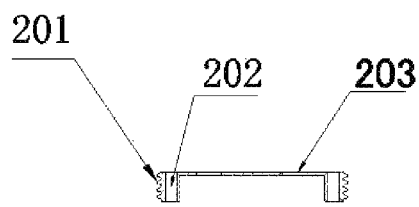
FIG. 12 is a sectional view of a filter element upper lid in the second embodiment of the present disclosure.
Figure 13:
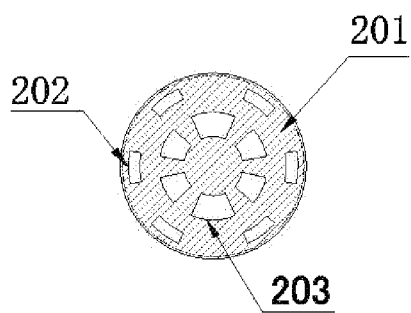
FIG. 13 is a plan view of the filter element upper lid in the second embodiment of the present disclosure.

As shown in FIGS. 10-13, in this embodiment, a switching ring 206 is provided on an upper portion of the sprayer housing. An inner thread is arranged on the inner side of the switching ring 206, and the periphery of the filter element upper lid 201 is provided with an external thread matched with the internal thread of the switching ring 206. The filter element upper lid 201 and the filter element are movably matched. When the switching ring 206 is rotated, the filter element upper lid 201 can move up and down between a first position and a second position relative to the filter element under the action of the threaded structure 207. The filter element upper lid 201 is provided with a plurality of outer ring openings 202 corresponding to the raw water chamber 208 and a plurality of inner ring openings 203 corresponding to the purified water chamber 209. As shown in FIG. 10, When the filter element upper lid 201 is moved down to the first position, the inner ring openings 203 abut against a lower sealing gasket 205 while the outer ring openings 202 are detached from an upper sealing gasket 204, so that the raw water chamber 208 of the filter element is in an open state and the purified water chamber 209 is in a close state, thus the water flowing from the top of he sprayer enters the purified water chamber 209 from the raw water chamber 208 after being filtered by the filter element, and then flows out through the water outlet panel assembly. In this way, high-quality filtered water can be obtained. As shown in FIG. 11, when the filter element upper lid 201 is moved up to the second position, the outer ring openings 202 abut against a upper sealing gasket 204 while the inner ring openings 203 are detached from the lower sealing gasket 205, so that the raw water chamber 208 of the filter element is in a close state and the purified water chamber 209 is in an open state, thus the water flowing from the top of the sprayer directly enters the water outlet panel assembly through the purified water chamber 209 and then flows out. In this way, although not being filtered by the filter element, a water flow with a large flow rate and a higher water pressure can be obtained because there is no flow resistance of the filter element, which is suitable for a general scenario where water quality requirements are not high. Except the above, other parts of the sprayer of the second embodiment are the same as those of the first embodiment.

Figure 14:
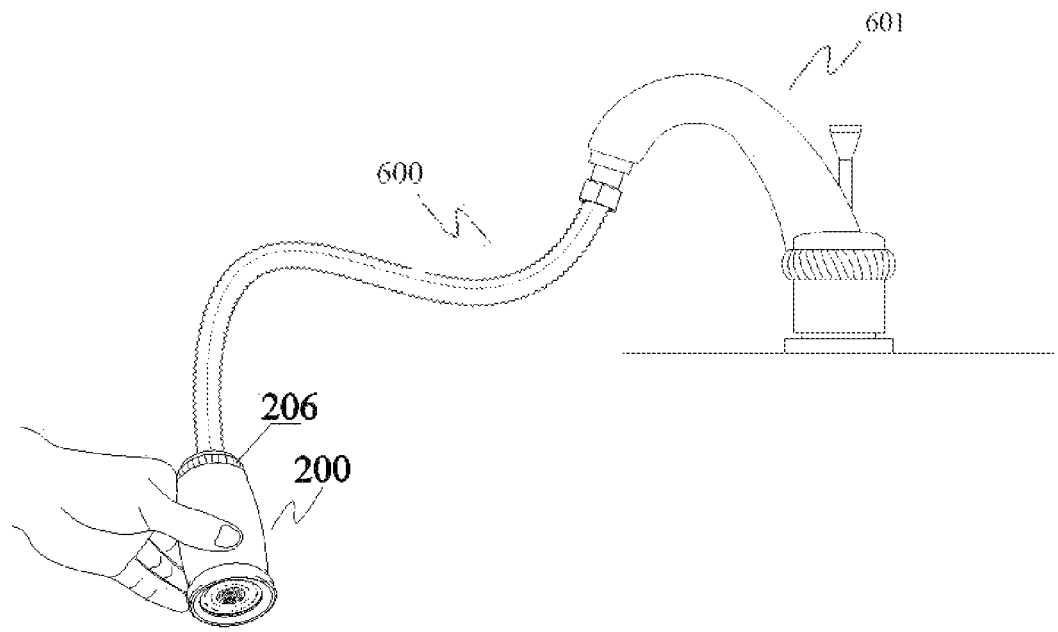
FIG. 14 is a perspective view of a pull-down faucet in the second embodiment of the present disclosure.

Further, a second pull-down faucet 601 according to the present disclosure, as shown in FIG. 14, uses a kitchen sprayer 200 with filter according to the present disclosure. A switching ring 206 is provided on an upper portion of the sprayer housing. The user can switch between two working states of water purification and flushing by rotating the switching ring 206, especially when the user holds the sprayer as shown in FIG. 14 (palm upward), where the thumb of the hand of the user holding the sprayer is close and convenient to toggle the switching ring 206 so that the user can switch the working state just by the single hand.

A third embodiment of a kitchen sprayer with filter according to the present disclosure is shown in FIGS. 15-18.

Figure 15:
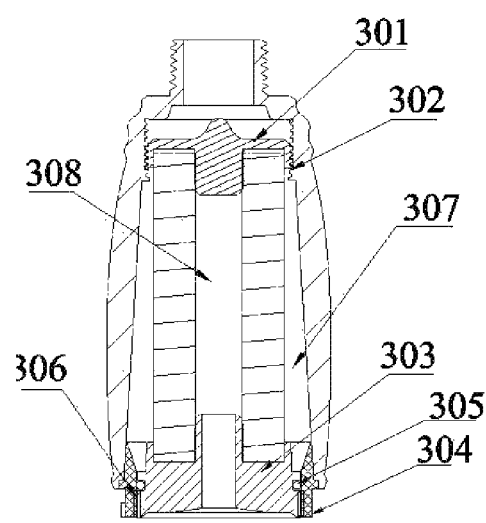
FIG. 15 is a sectional view of a sprayer in a filtering working state in a third embodiment of the present disclosure.
Figure 16:
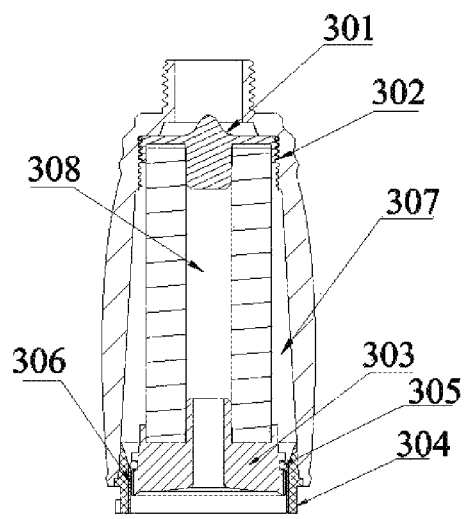
FIG. 16 is a sectional view of a sprayer in a directly flushing working state in the third embodiment of the present disclosure.
Figure 17:
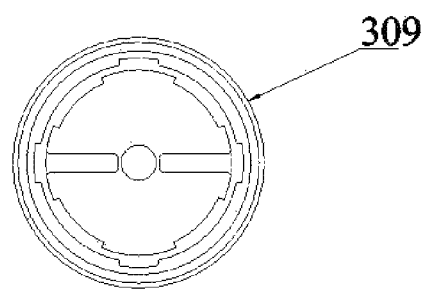
FIG. 17 is a plan view of a water outlet panel lid in the third embodiment of the present disclosure.

As shown FIGS. 15-17, the periphery of the filter element upper lid 301 is provided with an external thread. An inner thread is arranged on the inner side of the sprayer housing mating with the external thread, which forms a threaded structure 302. A rotating sleeve is arranged between a lower portion of the sprayer housing 304 and the filter element lower lid 303. A guiding and positioning strip and a guiding and positioning groove 306 which are matched with each other are arranged on a lower part of a periphery of the filter element lower lid 303 and an inner peripheral face of the rotating sleeve 304. The water outlet panel lid 309 is mounted on the rotating sleeve 304 through a snap member. Rotating the water outlet panel lid 309, the rotating sleeve 304 also rotates. The rotating of the rotating sleeve 304 drives the filter element to rotate through the guiding and positioning strip and the guiding and positioning groove 306. Further, the filter element assembly is configured to move up and down while rotating under the action of the threaded structure 302 arranged between the filter element upper lid 301 and sprayer housing, so that a sealing ring 305 provided outside an upper portion of the periphery of the filter element lower lid 303 switches between a sealed position and a disengaged position. When the sealing ring is in the sealed position as shown in FIG. 15, the sealing ring 305 forms a seal with an inner wall of the rotating sleeve 304. The water flow entering the raw water chamber 307 can only flow through the filter element, filtered and then enters the purified water chamber 308 of the filter element, and then flows out through the water outlet panel. In this way, high-quality filtered water can be obtained. when the user rotates the water outlet panel lid 309, the seal ring 305 moves up into the disengaged position as shown in FIG. 16, the sealing ring 305 is disengaged from the inner wall of the rotating sleeve 304, thus the seal is released. The water flow entering the raw water chamber does not flow into the purified water chamber 308 through the filter element any longer, indeed it directly flows through the flow channel between the periphery of the filter element lower lid 303 and the inner wall of the rotating sleeve 304, and flows out through the water outlet panel. In this way, although not being filtered by the filter element, a water flow with a large flow rate and a higher water pressure can be obtained because there is no flow resistance of the filter element, which is suitable for a general scenario where water quality requirements are not high. Except the above, other parts of the sprayer of the third embodiment are the same as those of the first embodiment.

Figure 18:
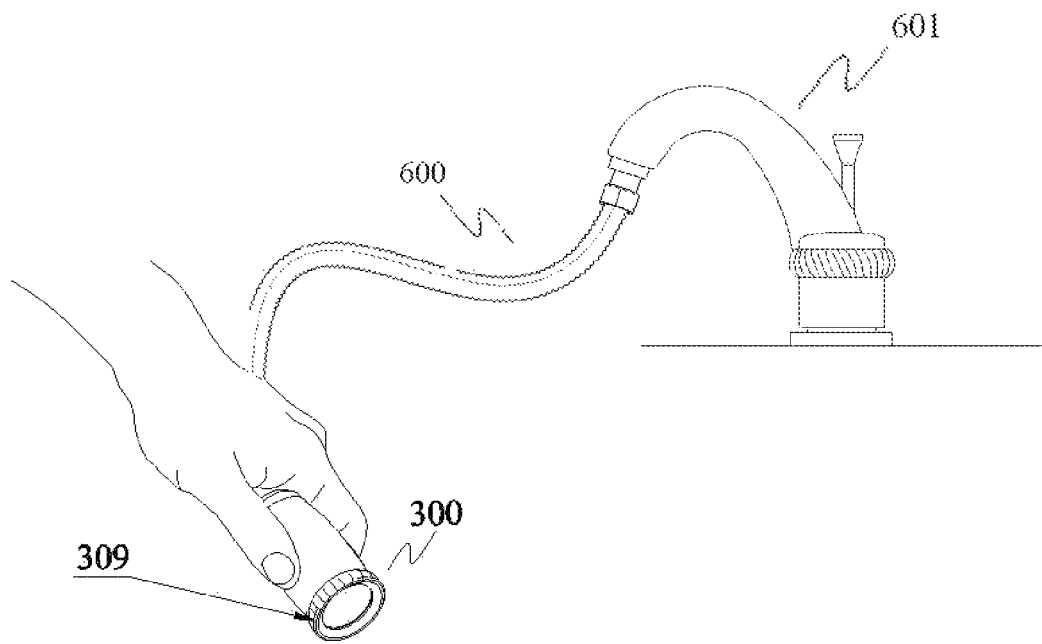
FIG. 18 is a perspective view of a pull-down faucet in the third embodiment of the present disclosure.

Further, a thirdly pull-down faucet 601 according to the present disclosure, as shown in FIG. 18, uses a kitchen sprayer with filter 300 according to the present disclosure. The user can switch between two working states of water purification and flushing by rotating the water outlet panel lid 309, especially when the user holds the sprayer as shown in FIG. 18 (palm downward), where the thumb of the hand of the user holding the sprayer is close and convenient to toggle the water outlet panel lid 309 so that the user can switch the working state just by the single hand.

Figure 19:
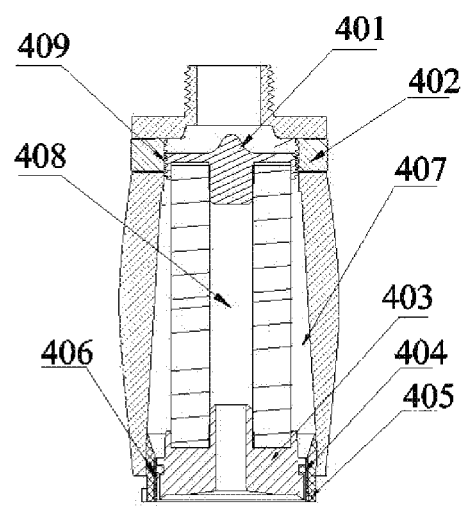
FIG. 19 is a sectional view of a sprayer in a filtering working state in a fourth embodiment of the present disclosure.
Figure 20:
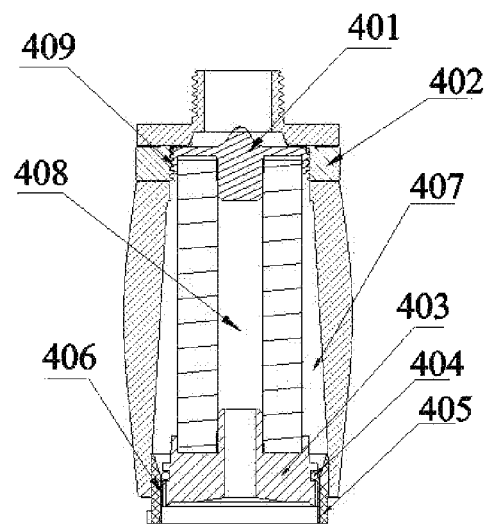
FIG. 20 is a sectional view of a sprayer in a directly flushing working state in the fourthly embodiment of the present disclosure.
Figure 21:
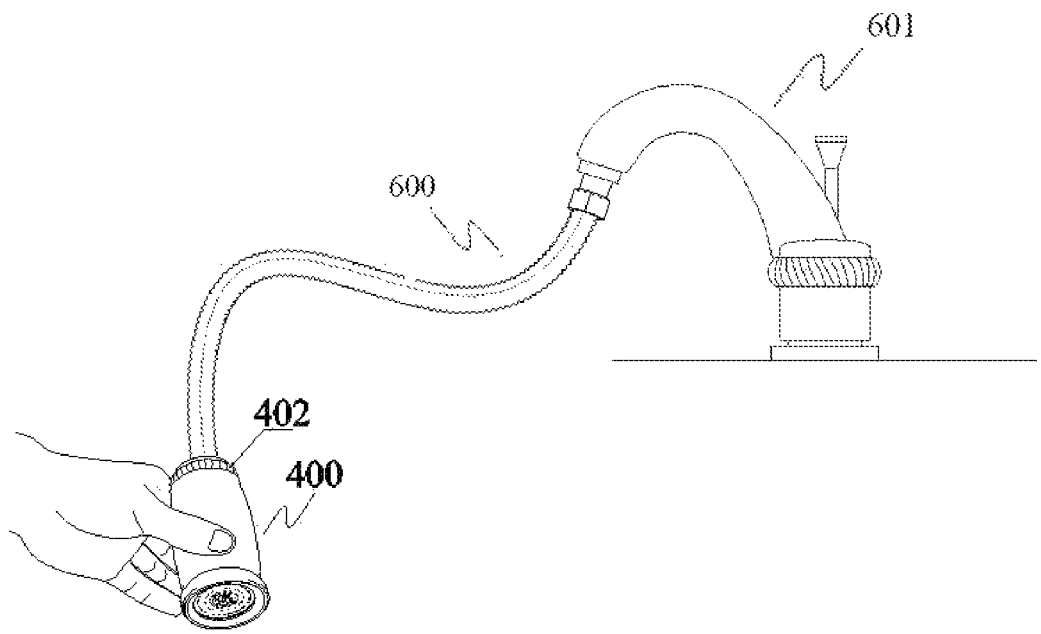
FIG. 21 is a perspective view of a pull-down faucet in the fourth embodiment of the present disclosure.

A fourth embodiment of a kitchen sprayer with filter according to the present disclosure is shown in FIGS. 19-21.

As shown in FIGS. 19-20, in this embodiment, a switching ring 402 is provided on an upper portion of the sprayer housing. An inner thread is arranged on the inner side the switching ring 402, and the periphery of the filter element upper lid 401 is provided with an external thread matched with the internal thread of the switching ring 402. The filter element upper lid 401 and the filter element are fixedly matched. A sleeve 405 is arranged between a lower portion of the sprayer housing 405 and the filter element lower lid 403. A guiding and positioning strip and a guiding and positioning groove 406 which are matched with each other are arranged on a lower part of a periphery of the filter element lower lid 403 and an inner peripheral face of the sleeve 405. When the switching ring 402 is rotated, the filter element assembly can move up and down between a sealed position and a disengaged position relative to the sleeve 405 under the action of the threaded structure 409. When the filter element assembly is in the sealed position as shown in FIG. 19, the sealing ring 404 provided outside an upper portion of the periphery of the filter element lower lid 403 forms a seal with an inner wall of the sleeve 405. The water flow entering the raw water chamber 407 can only flow through the filter element, filtered and then enters the purified water chamber 408 of the filter element, and then flows out through the water outlet panel. In this way, high-quality filtered water can be obtained. when the user rotates the switching ring 402, the filter element assembly moves into the disengaged position as shown in FIG. 20, the sealing ring 404 is disengaged from the sleeve 405, thus the seal is released. The water flow entering the raw water chamber 407 does not flow into the purified water chamber 408 through the filter element any longer, indeed it directly flows through the chamber between the periphery of the filter element lower lid 403 and the sleeve 405, and flows out through the water outlet panel. In this way, although not being filtered by the filter element, a water flow with a large flow rate and a higher water pressure can be obtained because there is no flow resistance of the filter element, which is suitable for a general scenario where water quality requirements are not high. Except the above, other parts of the sprayer of the fourth embodiment are the same as those of the first embodiment.

Further, a fourth pull-down faucet 601 according to the present disclosure, as shown in FIG. 21, uses a kitchen sprayer 400 with filter according to the present disclosure. A switching ring 402 is provided on an upper portion of the sprayer housing. The user can switch between two working states of water purification and flushing by rotating the switching ring 402, especially when the user holds the sprayer as shown in FIG. 21 (palm upward), where the thumb of the hand of the user holding the sprayer is close and convenient to toggle the switching ring 402 so that the user can switch the working state just by the single hand.

A fifth embodiment of a kitchen sprayer with filter according to the present disclosure is shown in FIGS. 22-25.

Figure 22:
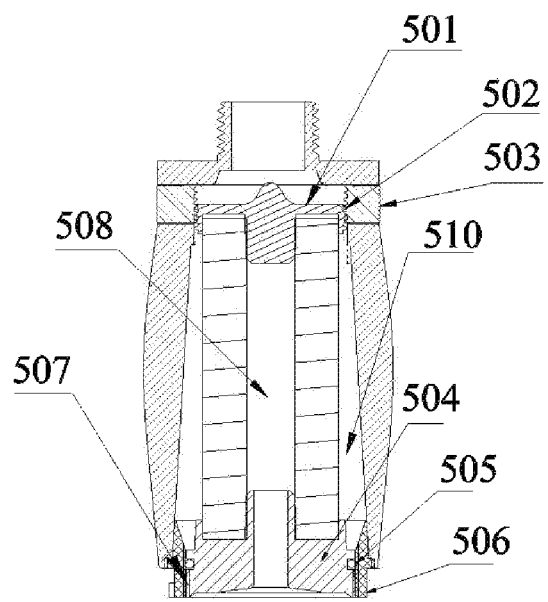
FIG. 22 is a sectional view of a sprayer in a filtering working state in a fifth embodiment of the present disclosure.
Figure 23:
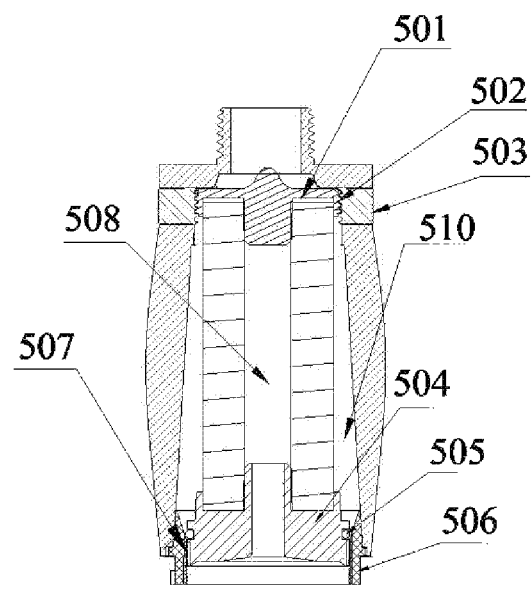
FIG. 23 is a sectional view of a sprayer in a directly flushing working state in the fifth embodiment of the present disclosure.
Figure 24:
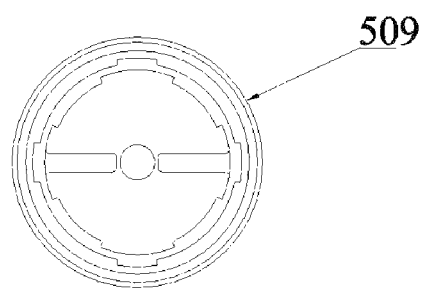
FIG. 24 is a plan view of a water outlet panel lid in the fifth embodiment of the present disclosure.

As shown in FIGS. 22-24, in this embodiment, a switching ring 503 is provided on an upper part portion of the sprayer housing. An inner thread is arranged on the inner side the switching ring 503, and the periphery of the filter element upper lid 501 is provided with an external thread matched with the internal thread of the switching ring 503. The filter element upper lid 501 and the filter element are fixedly matched. A rotating sleeve is arranged between a lower portion of the sprayer housing 506 and the filter element lower lid 504. A threaded structure 507 which are matched with each other are arranged on a lower part of a periphery of the filter element lower lid 504 and an inner peripheral face of the rotating sleeve 506. The water outlet panel lid 509 is mounted on the rotating sleeve 506 through a snap member. When the switching ring 503 is rotated or when the water outlet panel lid 509 is rotated so that the rotating sleeve 506 is rotated as well, a sealing ring 505 provided outside an upper portion of the periphery of the filter element lower lid 504 switches between a sealed position and a disengaged position under the action of the thread structure 502 or the thread structure 507. When the sealing ring 505 is in the sealed position as shown in FIG. 22, the sealing ring 505 forms a seal with an inner wall of the rotating sleeve 506. The water flow entering the raw water chamber 510 can only flow through the filter element, filtered and then enters the purified water chamber 508 of the filter element, and then flows out through the water outlet panel. In this way, high-quality filtered water can be obtained. When the seal ring 505 moves up into the disengaged position as shown in FIG. 23, the sealing ring 505 is disengaged from the inner wall of the rotating sleeve 506, thus the seal is released. The water flow entering the raw water chamber does not flow into the purified water chamber 508 through the filter element any longer, indeed it directly flows through the chamber between the periphery of the filter element lower lid 504 and the inner wall of the rotating sleeve 506, and flows out through the water outlet panel. In this way, although not being filtered by the filter element, a water flow with a large flow rate and a higher water pressure can be obtained because there is no flow resistance of the filter element, which is suitable for a general scenario where water quality requirements are not high. Except the above, other parts of the sprayer of the fifths embodiment are the same as those of the first embodiment.

Figure 25:
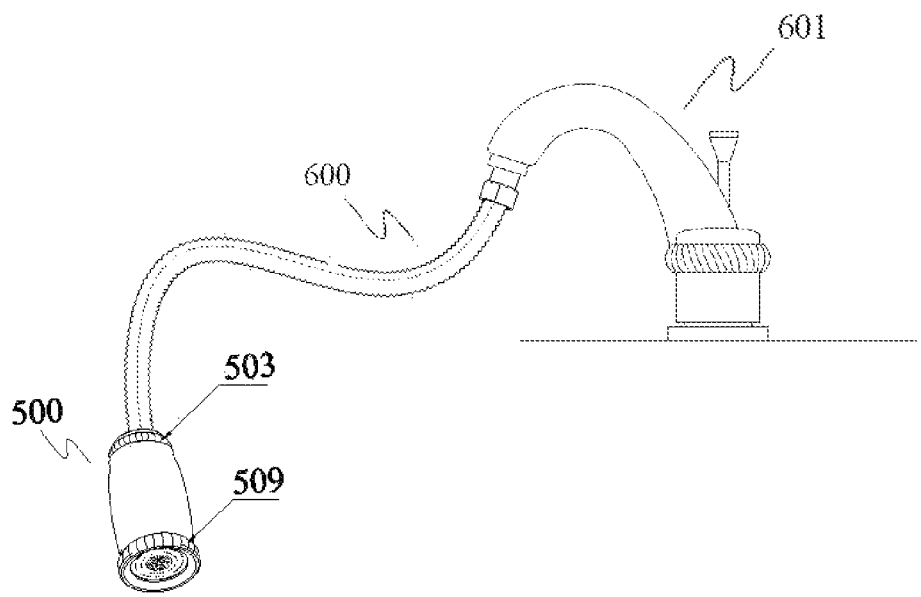
FIG. 25 is a perspective view of a pull-down faucet in the fifths embodiment of the present disclosure.

Further, a fifth pull-down faucet 601 according to the disclosure, as shown of FIG. 25, uses a kitchen sprayer 500 with filter according to the present disclosure. A switching ring 503 is provided on an upper portion of the sprayer housing; a rotatable water outlet panel lid is provided on an lower portion of the sprayer housing, which enables the user to easily switch the working state of the sprayer by a single hand no matter whether he holds the sprayer with his palm upward or downward.

In the present disclosure, the raw water is the water without being filtered by the filter element, and purified water is the water filtered by the filter element.

Preferred embodiments of the present disclosure are described in detail above. It should be understood that many modifications and variations can be made to the concepts of the present disclosure without creative efforts by those of ordinary skill in the art. Therefore, it would be obvious to a person skilled in the art to arrive at the technical solutions of the present disclosure by means of logical analysis, reasoning, or limited experiments on the basis of the prior art, all within the scope of protection defined by the claims.

What is claimed is:

1. A kitchen sprayer with filter, comprising:
    a sprayer housing, wherein a top of the sprayer housing comprises a water inlet connectable to a faucet or a hose;
    a filter element assembly arranged in the sprayer housing having a filter element upper lid, a filter element and a filter element lower lid, wherein the filter element is a hollow cylinder, an interior of the filter element is a purified water chamber, and an outside of the filter element is a raw water chamber; the filter element assembly is configured to be integrally mounted and disassembled with respect to the sprayer housing; a handle by which the filter element assembly can is configured to be taken out is arranged at a bottom of the filter element lower lid; and
    a water outlet panel assembly mounted on a bottom of the sprayer housing, wherein
    the water outlet panel assembly comprises a gasket, a water outlet panel and a water outlet panel lid.

2. The kitchen sprayer with filter as claimed in claim 1, wherein the filter element upper lid covers a top of the purified water chamber in the filter element, and the filter element lower lid is connected with the water outlet panel assembly; a sealing ring is arranged outside the filter element lower lid, and the raw water chamber connecting with the water inlet is defined between the sealing ring, the filter element and the sprayer housing.

3. The kitchen sprayer with filter as claimed in claim 1, wherein the water outlet panel comprises a plurality of water outlet holes arranged in a plurality of concentric circles, and a diameter of the water outlet holes on water inlet side is larger than on water outlet side.

4. The kitchen sprayer with filter as claimed in claim 1, wherein the water outlet panel assembly is mounted at the bottom of the sprayer housing through a snap member disposed on an inner wall of the water outlet panel lid and an outer edge of the bottom of sprayer housing.

5. The kitchen sprayer with filter as claimed in claim 1, wherein further comprises a switching device disposed on the sprayer housing and a threaded structure disposed on the filter element assembly, wherein when the switching device is rotated, the switching device is configured to drive the threaded structure to actuate a sealing device on the filter element assembly to move up and down, so that a flow channel of raw water entering from the water inlet is switched between passing through the filter element and not passing through the filter element.

6. The kitchen sprayer with filter as claimed in claim 5, wherein the sprayer housing has an upper portion and the upper portion comprises a switching ring, and the thread structure is arranged between the switching ring and the filter element upper lid; the filter element upper lid and the filter element are movably matched; when the switching ring is rotated, the filter element upper lid is configured to move up and down between a first position and a second position relative to the filter element under the action of the threaded structure; the filter element upper lid comprises a plurality of outer ring openings corresponding to the raw water chamber and a plurality of inner ring openings corresponding to the purified water chamber; when the filter element upper lid is moved to the first position, the inner ring openings abut against a lower sealing gasket while the outer ring openings are detached from an upper sealing gasket, so that the raw water chamber of the filter element is in an open state and the purified water chamber is in a close state, thus the raw water flowing from the water inlet enters the purified water chamber from the raw water chamber after being filtered by the filter element, and then flows out through the water outlet panel assembly; when the filter element upper lid is moved to the second position, the outer ring openings abut against a upper sealing gasket while the inner ring openings are detached from the lower sealing gasket, so that the raw water chamber of the filter element is in a close state and the purified water chamber is in an open state, thus the raw water flowing from the water inlet directly enters the water outlet panel assembly through the purified water chamber and then flows out.

7. The kitchen sprayer with filter as claimed in claim 5, wherein a rotating sleeve is arranged between a lower portion of the sprayer housing and the filter element lower lid; a guiding and positioning strip and a guiding and positioning groove matched with each other are arranged on a lower part of a periphery of the filter element lower lid and an inner peripheral face of the rotating sleeve; the water outlet panel lid is mounted on the rotating sleeve through a snap member; rotating the water outlet panel lid, the rotating sleeve also rotates and drives the filter element to rotate through the guiding and positioning strip and the guiding and positioning groove; the threaded structure is arranged between the filter element upper lid and sprayer housing; the filter element assembly is configured to move up and down integrally while rotating under the action of the threaded structure, so that a sealing ring provided outside the periphery of the filter element lower lid switches between a sealed position and a disengaged position; when the sealing ring is in the sealed position, the sealing ring forms a seal with an inner wall of the rotating sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the rotating sleeve, thus the seal is released, and the water flow entering the raw water chamber directly flows through the flow channel between the periphery of the filter element lower lid and the inner wall of the rotating sleeve, and flows out through the water outlet panel.

8. The kitchen sprayer with filter as claimed in claim 5, the sprayer housing has an upper portion and the upper portion comprises a switching ring, and the thread structure is arranged between the switching ring and the filter element upper lid; the filter element upper lid and the filter element are fixedly matched; a sleeve is arranged between a lower portion of the sprayer housing and the filter element lower lid; a guiding and positioning strip and a guiding and positioning groove matched with each other are arranged on a lower part of a periphery of the filter element lower lid and an inner peripheral face of the sleeve; when the switching ring is rotated, a sealing ring provided outside the periphery of the filter element lower lid switches between a sealed position and a disengaged position under the action of the threaded structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

9. The kitchen sprayer with filter as claimed in claim 5, wherein the sprayer housing has an upper portion and the upper portion comprises a switching ring, and a first thread structure is arranged between an inner side of the switching ring and an periphery of the filter element upper lid; the filter element upper lid and the filter element are fixedly matched; a rotating sleeve is arranged between a lower portion of the sprayer housing and the filter element lower lid; a second thread structure is arranged on a lower part of a periphery of the filter element lower lid and an inner peripheral face of the rotating sleeve; the water outlet panel lid is mounted on the rotating sleeve through a snap member; when the switching ring is rotated or when the water outlet panel lid is rotated so that the rotating sleeve is rotated as well, a sealing ring provided outside an upper portion of the periphery of the filter element lower lid switches between a sealed position and a disengaged position under the action of the first thread structure and the second thread structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

10. A pull-down faucet, is characterized by comprising a kitchen sprayer with filter and a retractable hose, wherein the kitchen sprayer comprises
a sprayer housing wherein a top of the sprayer housing comprises a water inlet connectable to a faucet or the retractable hose;
a filter element assembly arranged in the sprayer housing having a filter element upper lid, a filter element and a filter element lower lid, wherein the filter element is a hollow cylinder, an interior of the filter element is a purified water chamber, and an outside of the filter element is a raw water chamber; the filter element assembly is configured to be integrally mounted and disassembled with respect to the sprayer housing; a handle by which the filter element assembly is configured to be taken out is arranged at a bottom of the filter element lower lid; and
a water outlet panel assembly mounted on a bottom of the sprayer housing, wherein
the water outlet panel assembly comprises a gasket, a water outlet panel and a water outlet panel lid.

11. The pull-down faucet as claimed in claim 10, wherein the filter element upper lid covers the top of the purified water chamber in the filter element, and the filter element lower lid is connected with the water outlet panel assembly; a sealing ring is arranged outside the filter element lower lid, and the raw water chamber connecting with the water inlet is defined between the sealing ring, the filter element and the sprayer housing.

12. The pull-down faucet as claimed in claim 1, wherein the water outlet panel comprises a plurality of water outlet holes arranged in a plurality of concentric circles, and a diameter of the water outlet holes on water inlet side is larger than on water outlet side.

13. The pull-down faucet as claimed in claim 1, wherein the water outlet panel assembly is mounted at the bottom of the sprayer housing through a snap member disposed on an inner wall of the water outlet panel lid and an outer edge of the bottom of sprayer housing.

14. The pull-down faucet as claimed in claim 10, wherein further comprises a switching device disposed on the sprayer housing and a threaded structure disposed on the filter element assembly, wherein when the switching device is rotated, the switching device is configured to drive the threaded structure to actuate a sealing device on the filter element assembly to move up and down, so that a flow channel of raw water entering from the water inlet is switched between passing through the filter element and not passing through the filter element.

15. The pull-down faucet as claimed in claim 14, wherein the sprayer housing has an upper portion and the upper portion comprises a switching ring, and the thread structure is arranged between the switching ring and the filter element upper lid; the filter element upper lid and the filter element are movably matched; when the switching ring is rotated, the filter element upper lid is configured to move up and down between a first position and a second position relative to the filter element under the action of the threaded structure; the filter element upper lid comprises a plurality of outer ring openings corresponding to the raw water chamber and a plurality of inner ring openings corresponding to the purified water chamber; when the filter element upper lid is moved to the first position, the inner ring openings abut against a lower sealing gasket while the outer ring openings are detached from an upper sealing gasket, so that the raw water chamber of the filter element is in an open state and the purified water chamber is in a close state, thus the raw water flowing from the water inlet enters the purified water chamber from the raw water chamber after being filtered by the filter element, and then flows out through the water outlet panel assembly; when the filter element upper lid is moved to the second position, the outer ring openings abut against a upper sealing gasket while the inner ring openings are detached from the lower sealing gasket, so that the raw water chamber of the filter element is in a close state and the purified water chamber is in an open state, thus the raw water flowing from the water inlet directly enters the water outlet panel assembly through the purified water chamber and then flows out.

16. The pull-down faucet as claimed in claim 14, wherein a rotating sleeve is arranged between a lower portion of the sprayer housing and the filter element lower lid; a guiding and positioning strip and a guiding and positioning groove which are matched with each other are arranged on a lower part of a periphery of the filter element lower lid and an inner peripheral face of the rotating sleeve; the water outlet panel lid is mounted on the rotating sleeve through a snap member; rotating the water outlet panel lid, the rotating sleeve also rotates and drives the filter element to rotate through the guiding and positioning strip and the guiding and positioning groove; the threaded structure is arranged between the filter element upper lid and sprayer housing; the filter element assembly is configured to move up and down while rotating under the action of the threaded structure, so that a sealing ring provided outside the periphery of the filter element lower lid switches between a sealed position and a disengaged position; when the sealing ring is in the sealed position, the sealing ring forms a seal with an inner wall of the rotating sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the rotating sleeve, thus the seal is released, and the water flow entering the raw water chamber directly flows through the flow channel between the periphery of the filter element lower lid and the inner wall of the rotating sleeve, and flows out through the water outlet panel.

17. The pull-down faucet as claimed in claim 14, wherein the sprayer housing has an upper portion and the upper portion comprises a switching ring, and the thread structure is arranged between the switching ring and the filter element upper lid; the filter element upper lid and the filter element are fixedly matched; a sleeve is arranged between a lower portion of the sprayer housing and the filter element lower lid; a guiding and positioning strip and a guiding and positioning groove which are matched with each other are arranged on a lower part of a periphery of the filter element lower lid and an inner peripheral face of the sleeve; when the switching ring is rotated, a sealing ring provided outside the periphery of the filter element lower lid switches between a sealed position and a disengaged position under the action of the threaded structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

18. The pull-down faucet as claimed in claim 14, wherein the sprayer housing has an upper portion and the upper portion comprises a switching ring, and a first thread structure is arranged between an inner side of the switching ring and an periphery of the filter element upper lid; the filter element upper lid and the filter element are fixedly matched; a rotating sleeve is arranged between a lower portion of the sprayer housing and the filter element lower lid; a second thread structure is arranged on a lower part of a periphery of the filter element lower lid and an inner peripheral face of the rotating sleeve; the water outlet panel lid is mounted on the rotating sleeve through a snap member; when the switching ring is rotated or when the water outlet panel lid is rotated so that the rotating sleeve is rotated as well, a sealing ring provided outside an upper portion of the periphery of the filter element lower lid switches between a sealed position and a disengaged position under the action of the first thread structure and the second thread structure; when the sealing ring is in the sealed position, the sealing ring forms a seal with an inner wall of the sleeve, the water flow entering the raw water chamber flows through the filter element, filtered and then enters the purified water chamber of the filter element, and then flows out through the water outlet panel; when the seal ring is in the disengaged position, the sealing ring is disengaged from the inner wall of the sleeve, thus the seal is released, and the water flow entering the raw water chamber directly flows through the flow channel between the periphery of the filter element lower lid and the inner wall of the rotating sleeve, and flows out through the water outlet panel.

* * * * *